United States Patent
Von Der Lippe et al.

(10) Patent No.: US 8,418,248 B2
(45) Date of Patent: Apr. 9, 2013

(54) METHOD AND DEVICE FOR DEFENDING AGAINST ATTACKS TO SYSTEMS COMPRISING A PLUG AND PLAY FUNCTION

(75) Inventors: Carsten Von Der Lippe, Paderborn (DE); Bernd Richter, Borchen (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 12/919,620

(22) PCT Filed: Feb. 25, 2009

(86) PCT No.: PCT/EP2009/052233
§ 371 (c)(1),
(2), (4) Date: Aug. 26, 2010

(87) PCT Pub. No.: WO2009/112367
PCT Pub. Date: Sep. 17, 2009

(65) Prior Publication Data
US 2010/0333202 A1     Dec. 30, 2010

(30) Foreign Application Priority Data
Mar. 11, 2008 (DE) .......................... 10 2008 013 634

(51) Int. Cl.
*H04L 29/06* (2006.01)
(52) U.S. Cl.
USPC ........................................................ 726/23
(58) Field of Classification Search ...................... 726/23
See application file for complete search history.

(56) References Cited

U.S. PATENT DOCUMENTS

| | | | |
|---|---|---|---|
| 6,003,135 A | 12/1999 | Bialick et al. | |
| 7,959,072 B1* | 6/2011 | Jenkins et al. | 235/379 |
| 2002/0143921 A1 | 10/2002 | Stephan | |
| 2003/0009676 A1 | 1/2003 | Cole et al. | |
| 2005/0050353 A1* | 3/2005 | Thiele et al. | 713/201 |
| 2006/0107329 A1 | 5/2006 | Frank et al. | |
| 2006/0236392 A1* | 10/2006 | Thomas et al. | 726/23 |
| 2007/0204173 A1* | 8/2007 | Kuhn | 713/194 |
| 2008/0016339 A1 | 1/2008 | Shukla | |
| 2008/0022360 A1 | 1/2008 | Bacastow | |
| 2010/0333202 A1* | 12/2010 | Von Der Lippe et al. | 726/22 |
| 2011/0154481 A1* | 6/2011 | Kilgore et al. | 726/19 |

FOREIGN PATENT DOCUMENTS

| | | |
|---|---|---|
| DE | 102005008966 A1 | 8/2006 |
| EP | 1248179 A1 | 10/2002 |
| EP | 1708114 | 10/2006 |
| EP | 1708114 A2 | 10/2006 |
| FR | 2900298 A1 | 10/2007 |
| WO | WO-98/55912 A1 | 12/1998 |
| WO | WO-2005/120006 A1 | 12/2005 |
| WO | WO-2006/055420 A2 | 5/2006 |

OTHER PUBLICATIONS

European Patent Office Examination Report dated Mar. 4, 2011.

\* cited by examiner

*Primary Examiner* — Michael S McNally
(74) *Attorney, Agent, or Firm* — Harness, Dickey & Pierce, P.L.C.

(57) ABSTRACT

Method for recognizing attacks to at least one interface of a computer system, in particular an automated self-service machine, comprising: monitoring the interface in order to determine changes at the interface; if changes occur, the change is used to determine the probability that an unallowed attack is occurring at the interface; if the probability is beyond a defined threshold, defensive maneuvers are introduced.

17 Claims, 4 Drawing Sheets

METHOD AND DEVICE FOR DEFENDING AGAINST ATTACKS TO SYSTEMS COMPRISING A PLUG AND PLAY FUNCTION

CROSS-REFERENCE TO RELATED APPLICATIONS

This application is a National Stage of International Application No. PCT/EP2009/052233, filed Feb. 25, 2009. This application claims the benefit and priority of German application 102008013634.4 filed on Mar. 11, 2008. The entire disclosures of the above applications are incorporated herein by reference.

BACKGROUND

This section provides background information related to the present disclosure which is not necessarily prior art.

1. Technical Field

The invention relates to a method for detecting attacks on at least one interface of a computer system, in particular an attack on plug-and-play interfaces.

2. Discussion

A typical attack scenario today is to compromise a PC by using plug-and-play mechanisms, for example, executing a code through autoplay functions after inserting a USB memory stick. Protection against such attacks is increasingly in demand in the self-service environment. The problem, however, is that the complete plug-and-play functionality cannot be blocked as a precaution because this also restricts the required functionality of a cash dispensing machine (ATM). Solutions that, for example, do not allow the recognition and processing of external devices on the USB driver level if they are not entered on white lists (e.g. the USB filter driver discussed in PSD 5), are not unreservedly effective and do not represent a complete solution.

SUMMARY OF THE INVENTION

An object of the present invention is to increase the security of a computer system, in particular to prevent attacks on automated self-service machines, such as automated bank machines (automated teller machines) and automated sales machines that are set up in public.

The object is achieved by a method and a device having the features described herein.

Specifically, the object is achieved by a method to detect attacks on at least one interface of a computer system, preferably of an automated self-service machine, that constantly monitors the interface in order to determine changes at the interface. The monitoring can be interrupt controlled, be managed through data messages from drivers or be a poll-oriented approach. The interrupt can be triggered by the hardware as well as the software by a process when data arrive at the interface or are sent by said interface. Data messages can also be made available from other layers of software that are then prepared by inter-process communication. In one possible embodiment, modified or additional drivers are used.

In the event that changes occur, based on the type of change, the probability of an unauthorized attack on or through the interface is determined. Changes are normally unusual data traffic. Unusual data traffic is very probable when a device logs in and logs out at the interface. Altered communication protocols are also suspicious. Furthermore, the content of the data may be unusual if the sort of data does not match the type of device connected. Block-oriented traffic (e.g. hard disk, USB stick) is unusual for a character-oriented device, such as a keypad. For example, if a USB stick logs in as a keypad at a USB interface, this is unusual. If the probability of an attack is beyond a defined threshold, defensive measures are introduced.

The list of connected devices is monitored through an ALU. If it is determined that the probability of an attack is beyond a defined threshold, a log entry for a post-mortem diagnosis is generated, if necessary a message is sent to a remote server, and the system is shut down with immediate effect in order to prevent the attack from taking effect. Further, an immediate shutdown of the computer system is also conceivable without the use of a remote server. Warning messages, such as SMS, e-mail, SMTP can be sent to a target system or a target person. Additional possibilities are the deactivation of the entire interface or only the deactivation of the newly connected device. It is further conceivable that the system switches to a safety mode that does not allow additional devices to be connected and that can only be reversed by a service technician.

An overview of the interfaces is given in what follows, with the list making no claim to completeness: serial interface, parallel interface, serial bus interface, parallel bus interface, networks, wireless network interface, optical network interface, wired network interface, IEEE 1394, FireWire, IEEE 1284, LAN, WLAN, Bluetooth, PS/2, RS232.

It is self-evident that technological successors are included.

Special attention is paid to plug-and-play interfaces, such as USB or FireWire which immediately trigger a reaction on the computer system when a device is connected (such as the installation of a driver). If only one type of interface (e.g. USB) is discussed in more detail in what follows, this does not mean that the invention is restricted. It is more a matter of the most familiar type of interface with a very high risk potential.

One or more of the following events is taken into consideration when calculating probability:

Reliability of the serial number of the device connected to the interface. In the case of a filter driver, the device can be accepted or rejected based on lists. The serial number can be restricted based on lists/samples.

Number of devices connected to the system and/or an interface. Individual devices, device classes or maker/product combinations show up only as a limited number of devices in the system. For example, most computer systems have a maximum of one MFII keyboard connected. If a second one is connected in parallel, this is evidence of an attack. Various multi-function systems have two keyboards (one at the front for the customer, one at the back for service). In this case, a third keyboard is critical. The number of devices permitted per class is the result of the hardware configuration and service strategy for the device. This setting can, of course, be adjusted to the type of device. The same approach applies to other input media (card reader) or storage media (hard disks).

A further aspect is device paths that must be taken into consideration. In the case of USB devices, for example, the device path is the "way" to the PC, i.e. the port and the hubs by which a device is connected. Devices from service, for example, are often connected directly to the PC, whereas devices that have no special speed requirements, or require a long cable connection, are often connected via hubs. If a keyboard, for example, is now connected via a hub to a PC to which otherwise only printers are hooked up, this is an unusual event that is incorporated into the scoring.

A further aspect is the reliability of the maker/product combination of the connected device. Many devices that are approved for operation in a self-service system have a fixed relationship for maker code, product code and device class. To this extent the combination provides indications whether a device should be permitted or not. Of course, it is not out of the question that these codes are counterfeited. However, if an error is made at the imitators with this combination, e.g. vendor ID, product ID, device class do not agree, this can be included in the scoring.

EXAMPLE

In order to circumvent the filter driver mentioned above, someone programs a device that has the same vendor ID and product ID as a card reader installed in a system. The device is thus approved. However, the "counterfeit" device class is a keypad (which is generally approved as a device class). Since it is known that no keypad from this vendor exists, this is an indication that this device is potentially dangerous.

In this case, it should also be taken into consideration that it is normal in some instances if a device "disappears" or "turns up" again in ongoing operation, e.g. because a peripheral was booted.

A further aspect is the temporal coincidence of identifying and removing devices.

If it happens that a new device is detected that is connected to a port and a short time previously another device was disconnected from this port, this is suspicious if the new device is in a different device class, since it is not simply a matter of exchanging devices, which often happens in the service area. This criterion is hardly of significance if there is a sufficient number of free ports in the computer system. On the other hand, it is sometimes substantially more relevant, for example, if in a rearload (where there are sufficient free ports at the back) a device is removed and another one is hooked up directly behind the front. It is also conceivable to design this monitoring to be port-independent in order to link it to other criteria. For example, it may be permissible to exchange a device only in the service mode. In this case a logical link would be incorporated.

A further aspect is the time of day at which changes are detected on the interface. The current (local) time is a further indication whether a plug-and-play activity is permitted or not. For example, it can rarely be assumed that authorized service activity is taking place in the middle of the night. This criterion is heavily dependent on the location of the computer system.

The operating mode, e.g. as an AND gate or as a multiplier, can be integrated into all aspects. An automated self-service machine knows different operating modes. For example, "customer operation" or "service mode". During the service mode it is normal for devices to be plugged in or removed, but not in normal "customer operation". In many instances additional authentication ensures that the "service mode" can only be opened by authorized personnel.

Based on these criteria, the probability of attack can be calculated in one embodiment using a scoring system. Particularly serious attacks have high indicators which can then be added with others, or as in the case of the operating mode perform a multiplication. A logic gate is, of course, also conceivable. When a threshold is exceeded, appropriate defensive measures can be introduced.

Depending on the operating system possible implementation through modified drivers is also conceivable. One embodiment is described further below. In said embodiment, the entire procedure, or parts thereof, is implemented by a driver for the interface. The driver can take various forms. One the one hand, it can replace the standard bus driver completely. The standard bus driver is replaced by a modified driver that implements aspects of the procedure or parts thereof in addition to the standard functionality. An additional driver, which is arranged logically below the standard driver, can be used so that the information reaching the standard driver can be forwarded after being filtered. In like manner, an additional driver, which is arranged logically above a standard driver, can be used so that information is forwarded to the system after being filtered. The prerequisite is that specific device drivers are used for each device connected to the interface.

In an alternative embodiment, a software process that continuously monitors traffic on the interface to detect an unauthorized attack is interrupt controlled or poll-oriented.

The monitor instance installed on the system monitors which devices are connected to plug-and-play capable connections.

The scoring system cited above and the actions derived therefrom should be configurable, preferably remotely from a second system to which a network connection exists.

In a further embodiment, these individual criteria for the scoring system are not calculated and totaled individually but linked to each other. For example, the criterion "temporal coincidence of detection and removal" to "device path" to establish that a device was replaced at the front or back side.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Even if the discussion in what follows is primarily about USB connections, most rules can be applied to other connections.

Figure 1:
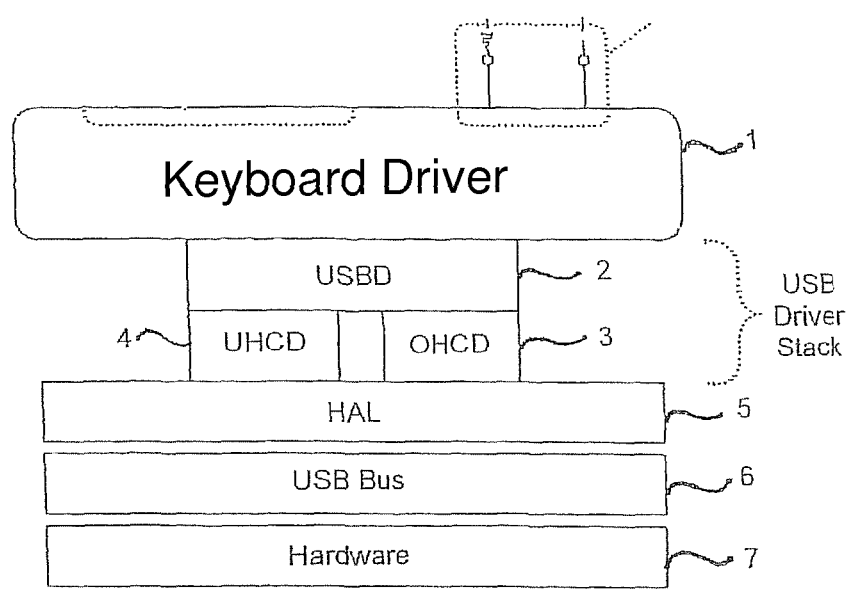
FIG. 1 shows a driver schematic for a standard keypad driver.

FIG. 1 shows a layer structure for a driver model, such as is used in the Windows operating system. The hardware 7 should be regarded as the bottom layer, configured in the present instance as a keypad. The physical USB bus 6 is configured on top of said layer, consisting of a cable and a USB connector (part of the chip set or separate plug-in cards) on the computer system. A software layer 5 of the hardware abstraction layer (HAL) is arranged above said bus, on which in turn maker-specific USB bus drivers are arranged. The UHCD driver 4 and the OHCD driver 6 represent various USB chip implementations from different makers, such as Intel or VIA. The general USBD driver 2 for the operating system is located on top of said drivers. The three named drivers form the USB driver stack 8. Since a plurality of devices can be connected to a single USB bus, the drivers for the individual devices combine with the USB driver stack and report to said stack. The driver stack then sends the information to the appropriate device driver 1, depending on the identification of the data received over the bus.

Figure 2:
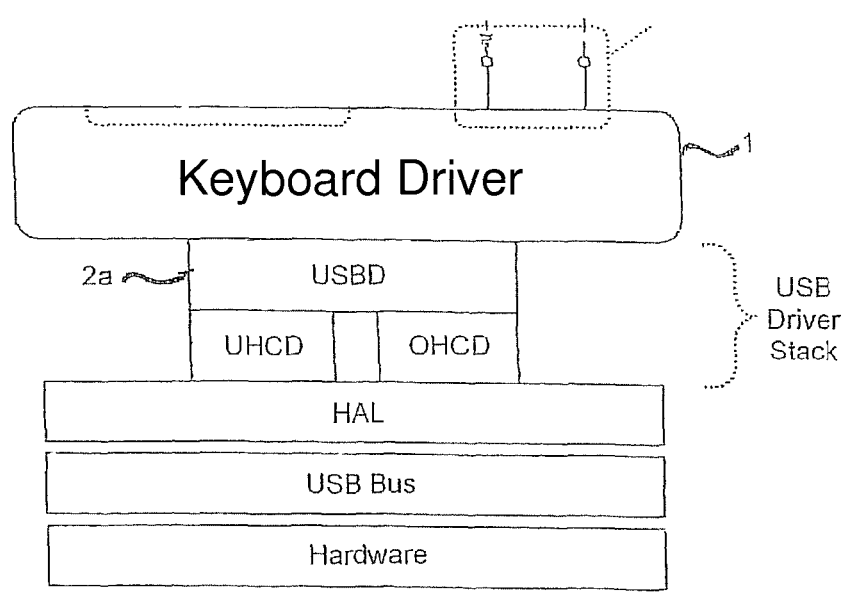
FIG. 2 shows a driver schematic with a modified USB driver stack (USBD) driver.
Figure 3:
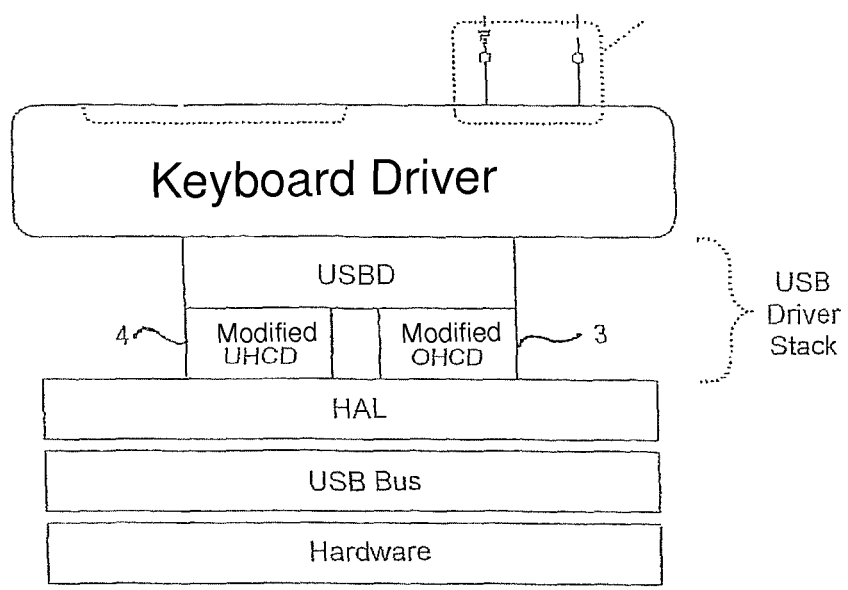
FIG. 3 shows a driver schematic with a driver below the USBD driver.

FIG. 2 shows an alternative version in which the USBD driver 2a has been modified. FIG. 3 shows an alternative version in which the modified drivers lie underneath the USBD driver. The OHCD driver 3a and the UHCD driver 4a have been modified.

Figure 4:
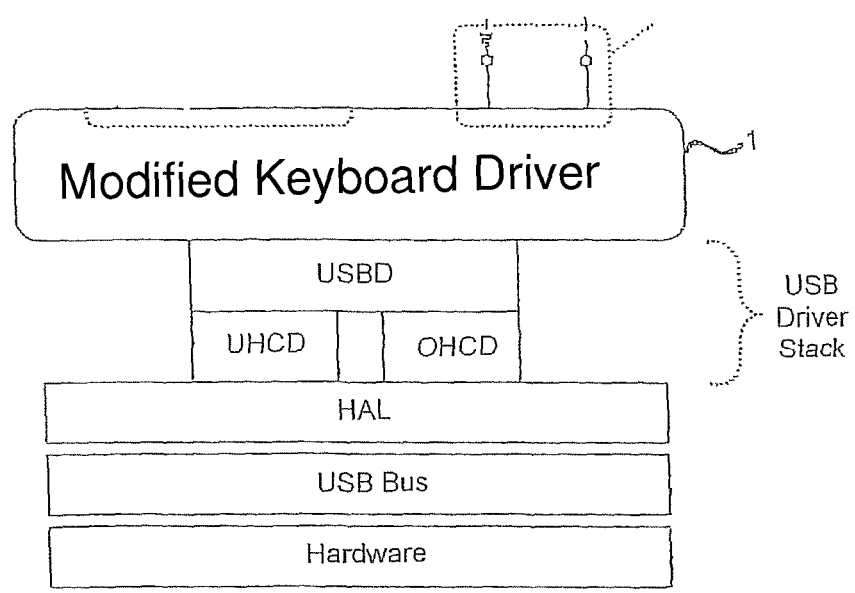
FIG. 4 shows a driver schematic with a driver above the USBD driver that is configured as modified keypad driver.

FIG. 4 shows a modified keypad driver 1a. It must be noted in this approach that modified drivers must be provided for all potential devices.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for recognizing attacks on at least one interface of an automated self-service machine, to which at least one peripheral device of the automated self-service machine is connected, the method comprising:
   monitoring of the interface to detect changes at the interface;
   if changes occur, calculating a probability of an unauthorized attack on the interface based on the type of change;
   wherein one or more of the following events is taken into consideration in calculating the probability:
   a reliability of a serial number of the at least one peripheral device connected to the interface;
   a reliability of a maker/product combination for the at least one peripheral device;
   a reliability of a device class of the at least one peripheral device;
   a reliable number of devices from a device class of the at least one peripheral device;
   a time interval between removing a device from and connecting a device to the interface;
   a device path or type of connection;
   a time of day at which a device is connected to or removed from the interface; and
   a mode for the automated self-service machine when a device is connected to or removed from the interface, including a customer operation mode or a service mode;
   and wherein if the probability is beyond a defined threshold, defensive measures are introduced.

2. The method from claim 1, wherein the defensive measures comprise one or more of the following procedures: creating a log entry, automatic shutdown of the computer system, sending a warning message to a target system or a target person, deactivating the interface, deactivating a recently connected device, switching to a security mode.

3. The method from claim 1, wherein a preferably adjustable point value is assigned to each event, and the events are totaled so that a check can be made based on the total whether a threshold was exceeded in order to then introduce a defensive measure.

4. The method from claim 1, wherein the automated self-service machine is an automated bank machine and/or an automated bottle vending machine.

5. The method from claim 4, wherein the self-service machine allows customer operation and maintenance operation, where one or more thresholds and/or probabilities are different depending on the type of operation.

6. The method from claim 1, wherein the interface is one or more of the following:
   serial interface, parallel interface, serial bus interface, parallel bus interface, networks, wireless network interface, optical network interface, cable network interface, IEEE 1394, FireWire, IEEE 1284, LAN, WLAN, Bluetooth, PS/2, RS232.

7. The method from claim 6, wherein the interface has a plug-and-play function that triggers an automatic action on the computer system.

8. The method from claim 1, wherein the method, or parts of the method, is implemented by a driver for the interface that possesses one or more of the following properties: replacement of the standard interface driver by a modified driver that, in addition to the existing functionality, implements the functionality of the method or parts thereof; additional driver that is arranged logically below the standard driver so that the information that reaches the standard driver is forwarded after being filtered; additional driver that is arranged logically above a standard driver so that information is forwarded to the system after being filtered.

9. The method from claim 1, wherein a software process continuously monitors the traffic on the interface in order to detect an unauthorized attack.

10. An automated self-service machine having at least one interface, to which at least one peripheral device of the automated self-service machine is connected, comprising an ALU for monitoring the at least one interface to determine changes at the at least one interface; in the event that changes occur, the ALU determines a probability of an unauthorized attack on the at least one interface based on the type of change; wherein the ALU takes into consideration one or more of the following events in calculating the probability:
   a reliability of a serial number of the at least one peripheral device connected to the interface;
   a reliability of a maker/product combination of the at least one peripheral device;
   a reliability of a device class of the at least one peripheral device;
   a reliable number of devices from a device class of the at least one peripheral device;
   a device path or type of connection;
   a time interval between removal of a device from and connection to the interface;
   a time of day at which a device is connected to or removed from the interface; and
   a mode for the automated self-service machine when connecting a device to or removing a device from the interface, including a customer operation mode or a service mode;
   and wherein if the probability is beyond a defined threshold, defensive measures are introduced through the ALU.

11. The automated self-service machine from claim 10, wherein defensive measures are introduced through the ALU that comprise one or more of the following procedures: creating a log entry on a data carrier, shutting down the computer system automatically, sending a warning message to a target system or a target person over a network, deactivating the interface, deactivating a recently connected device, switching to a security mode.

12. The automated self-service machine from claim 10, wherein a preferably adjustable point value is assigned to each event, said value can be filed on a storage system and the ALU (arithmetic logic unit) totals the events so that a check can be made based on the total whether a threshold was exceeded in order to introduce a defensive measure.

13. The automated self-service machine from claim 10, wherein the automated self-service machine is an automated bank machine or an automated bottle vending machine.

14. The automated self-service machine from claim 13, wherein the ALU switches to customer operation and to maintenance operation each of which concerns a measure of security, wherein one or more thresholds and/or probabilities are different depending on the type of operation.

15. The automated self-service machine from claim 10, wherein the interface is one or more of the following, including technical successors: serial interface, parallel interface, serial bus interface, parallel bus interface, network interface, wireless network interface, optical network interface, cable network interface, IEEE 1394, FireWire, IEEE 1284, LAN, WLAN, Bluetooth, PS/2, RS232.

16. The automated self-service machine from claim 10, comprising a driver for the interface that possesses one or more of the following properties: replacement of the standard interface driver by a modified driver that, in addition to the existing functionality, implements the functionality of the method or parts thereof; additional driver that is arranged logically below the standard driver so that the information that reaches the standard driver is forwarded after being filtered; additional driver that is arranged logically above the standard driver so that information is forwarded to the system after being filtered.

17. The automated self-service machine from claim 10, comprising a device that comprises a software process that continuously monitors the traffic on the interface in order to detect an unauthorized attack.

* * * * *